United States Patent [19]

Griffin et al.

[11] 4,414,381

[45] Nov. 8, 1983

[54] THERMOTROPIC POLYESTER ANHYDRIDE POLYMERS

[75] Inventors: Brian P. Griffin, St. Albans; William A. MacDonald, Ware, both of England

[73] Assignee: Imperial Chemical Industries PLC, London, England

[21] Appl. No.: 328,395

[22] Filed: Dec. 7, 1981

[30] Foreign Application Priority Data

Dec. 22, 1980 [GB] United Kingdom ............... 8040953

[51] Int. Cl.$^3$ .................. C08G 63/18; C08G 63/60; C08G 69/44
[52] U.S. Cl. .................... 528/190; 528/364; 528/422; 528/425; 528/125; 528/126; 528/128; 528/172; 528/173; 528/183; 528/184; 528/185; 528/191; 528/193; 528/194; 528/195; 528/206; 528/208; 528/209; 528/210; 528/212; 528/220; 528/229; 528/271; 528/337; 528/339; 528/340; 528/344; 528/348; 528/360; 528/361; 528/363
[58] Field of Search ............... 528/125, 126, 128, 162, 528/172, 173, 183, 184, 185, 190, 191, 193, 194, 195, 206, 208, 209, 210, 212, 220, 229, 271, 337, 339, 340, 344, 348, 360, 361, 363, 364, 422, 425

[56] References Cited

U.S. PATENT DOCUMENTS 3,200,097  8/1965  Windholz ........................ 260/75
3,515,695  6/1970  Loughran et al. ............... 528/167

FOREIGN PATENT DOCUMENTS 7715   2/1980  European Pat. Off. .
838986 6/1960  United Kingdom .
263140 5/1970  U.S.S.R. ........................... 528/190

OTHER PUBLICATIONS

Yoda, Makromolekulare Chemie, vol. 32, pp. 1–12 (1959).
Conix, Journal of Polymer Science, vol. 29, pp. 343–353 (1958).

*Primary Examiner*—Lester L. Lee
*Attorney, Agent, or Firm*—Cushman, Darby & Cushman

[57] ABSTRACT

A melt-processable aromatic polyester anhydride characterized in that from 5 to 80% of the units linking the reactant residues in the polymer chain have the formula:

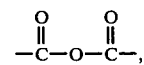

the remaining linkages between the residues of the reactants being of the formula:

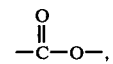

optionally together with linkages of the formula:

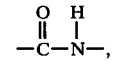

substantially all of said remaining linkages being disposed in coaxial or parallel and oppositely directed manner with respect to the residues to which they are linked, the polyester anhydride having a solubility of less than 5% by weight in dimethyl sulphoxide at room temperature.

7 Claims, No Drawings

THERMOTROPIC POLYESTER ANHYDRIDE POLYMERS

This invention relates to aromatic condensation polymers and to processes of obtaining such polymers.

Polyanhydrides in which the whole of the residues in the polymer chain are linked through anhydride groups of formula:

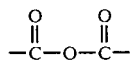

have been described in the Journal of Polymer Science, Volume 29, pages 343 to 353 (1958) and in Makromoleculare Chemie Volume 32 pages 1 to 12 (1959). These polymers are susceptible to hydrolysis compared with polyesters or polyamides. Japanese Patent Publication 48-3716 discloses a process for the production of polyester anhydrides in which p-hydroxybenzoic acid or p-acetoxybenzoic acid and terephthalic or isophthalic acid are polycondensed in acetic anhydride. The purpose of the invention is to produce polymers of improved solubility with respect to p-hydroxybenzoic acid polymers. The polymers produced are stated to be soluble at room temperature in dimethyl sulphoxide, o-chlorophenol, benzyl alcohol, N-methyl pyrrolidone, and dimethyl formamide. Anhydride-containing polymers have now been found having an improved balance of properties.

According to the invention there is provided a melt-processable aromatic polyester anhydride characterised in that from 5 to 80% of the units linking the reactant residues in the polymer chain have the formula:

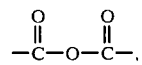

the remaining linkages between the residues of the reactants being of the formula:

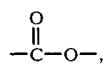

optionally together with linkages of the formula:

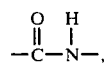

substantially all of said remaining linkages being disposed in coaxial or parallel and oppositely directed manner with respect to the residues to which they are linked, the polyester anhydride having a solubility of less than 5% by weight in dimethyl sulphoxide at room temperature.

The reactants which give rise to the residues linked through:

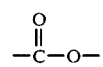

or:

groups are aromatic reactants capable of forming polyesters, polyamides or polyesteramides in their own right such as hydroxyaryl carboxylic acids, aminophenols, aminoaryl carboxylic acids, dihydric phenols and aromatic discarboxylic acids, together with their ester, amide or esteramide forming derivatives, the reactive groups being positioned in the reactants so that substantially all the reactants used in a given polymer have their chain extending bonds disposed in a coaxial or parallel and oppositely directed manner.

The anhydride groups may be introduced into the polymer chain by reaction of materials containing the appropriate reactive groups such as by reacting a difunctional material at least one free carboxyl group, or a corresponding salt, with a difunctional material containing at least one acid chloride group. Alternatively, anhydride linkages are introduced by reacting a difunctional reactant containing at least one hydroxyl acid group with an excess of a difunctional reactant is a mixed anhydride having at least one functional group of the formula:

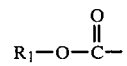

where $R_1$ is an acyl radical derived from an aliphatic monocarboxylic acid.

Accordingly, there is provided a melt-processable aromatic polyester anhydride characterised in that it contains from 5 to 8 mole % of anhydride residues derived from a mixed anhydride of formula:

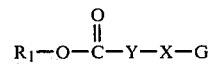

wherein X is a divalent radical comprising one or more fused or separate aromatic rings, Y may be a direct link, a —$(CH_2)_n$—group or a —$(CH_2)_nO$—group in which n may be from 1 to 4 and the ether oxygen, if present, is linked directly to X, $R_1$ is an acyl radical derived from an aliphatic monocarboxylic acid and G is a functional group capable of entering into chain extending reactions and which may be the same or different to the radical

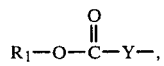

the remaining residues in the polymer chain being aromatic residued by ester and, optionally, amide linkages substantially all of which linkages are coaxial or in parallel and oppositely directed disposition on the aromatic residues, the polyester anhydride having a solubility of less than 5% by weight in dimethyl sulphoxide at room temperature.

The groups G and

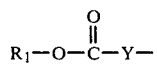

are preferably disposed on the divalent radical X so that the chain extending bonds are coaxial or are parallel and oppositely directed. This is, however, not an essential requirement of the invention and the groups may, for example, be disposed in meta or ortho positions on a single aromatic ring.

In polyester anhydrides according to the invention the inclusion of a proportion of anhydride linkages in a polymer in which the remaining linkages are either coaxial, that is are positioned 1,4- to each other if attached to the same ring, or if in different rings are in positions parallel and oppositely directed, results in improvements in processability of the polymer. For example, a polymer of p-hydroxybenzoic acid or polymers of unsubstituted dihydric phenols and unsubstituted dicarboxylic acids are polymers which are intractable or processable only with difficult because they tend to decompose before melting. The inclusion of at least 5% of anhydride linkages of formula:

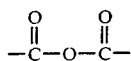

in such polymers introduces a degree of flexibility into the otherwise rigid chain which enables the melting point of the polymer to be reduced to an extent that a substantially non-melt-processable polymer is then capable of being melt processed. In addition to converting non-melt-processable polymers into melt-processable polymers the inclusion of a proportion of anhydride linkages can improve the processability of a polymer which is already melt processable. The physical properties of the polymer, such as toughness, melt strength, extensibility may also be improved.

Surprisingly, a considerable range of the polymers according to the invention exhibit liquid crystal behaviour in the melt (thermotropic behaviour). The invention is not, however, limited to polymers which are capable of forming thermotropic melts. Useful advantages may be obtained by incorporation of the anhydride linkages even though the resulting polymer is not thermotropic.

The mixed anhydrides used in the invention may be prepared by the known processes, such as by heating an appropriate dicarboxylic acid in the presence of an excess of an anhydride of a monofunctional carboxylic acid, such as acetic anhydride. Alternatively free acids or their alkali metal salts may be reacted with acyl chlorides.

Suitable dicarboxylic acids for use in the reaction are those of formula:

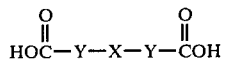

where Y is preferably a direct link but may be a divalent —$(CH_2)_n$— or $(CH_2)_nO$—radical in which n may be from 1 to 4 and the ether oxygen, if present, is directly linked to X, and the:

groups are symmetrically disposed on the divalent aromatic radical X. The divalent aromatic radical X comprises one or more fused or seperate aromatic rings. The groups of formula:

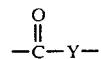

are symmetrically disposed on the divalent aromatic radical X in the sense that the bonds joining the moiety to other moieties in the main chain are symmetrically disposed on one or more aromatic rings, for example are diagonally disposed when present on a naphthalene ring or are in para, meta or ortho positions in single rings, or are both in para position or both in meta positions in multiple but separate rings.

It is preferred, for reasons of cost, that Y is a direct link, X is a single aromatic ring and the carboxyl groups are disposed in either para, meta or ortho positions on the single ring. Thus terephthalic and isophthalic acids are the preferred acids for forming the mixed anhydride with the monofunctional carboxylic acid anhydride. Alternative difunctional acids are 2,6-dicarboxynaphthalene and bibenzoic acid. A variety of other alternative acids may be used to form the mixed anhydride such as those in which X is a group of formula:

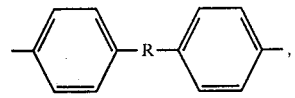

Y is a direct link and R is selected from a divalent linear polymethylene radical consisting of 2 to 8 methylene groups wherein one or more non-adjacent methylene groups may or may not be replaced by an ether oxygen atom, and a group of formula:

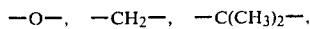

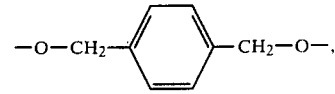

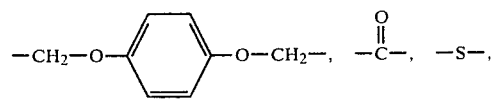

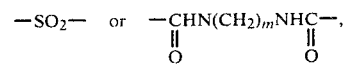

where m is 1 to 6.

Typical acids falling within this class are:
diphenoxymethane-p-p¹-dicarboxylic acid,
diphenoxymethane-m-m¹-dicarboxylic acid,
1:3-diphenylpropane-p-p¹-dicarboxylic acid,
1:3-diphenylpropane-m-m¹-dicarboxylic acid,
1:4-diphenylbutane-p-p¹-dicarboxylic acid,
1:4-diphenylbutane-m-m¹-dicarboxylic acid,
1:5-diphenylpentane-p-p¹-dicarboxylic acid,
1:5-diphenylpentane-m-m¹-dicarboxylic acid,
1:6-diphenylhexane-p-p¹-dicarboxylic acid,
1:6-diphenylhexane-m-m¹-dicarboxylic acid,
1:2-diphenoxyethane-p-p¹-dicarboxylic acid,
1:2-diphenoxyethane-m-m¹-dicarboxylic acid,
1:3-diphenoxypropane-p-p¹-dicarboxylic acid, 1:3-diphenoxypropane-m-m¹-dicarboxylic acid,
1:4-diphenoxybutane-p-p¹-dicarboxylic acid,
1:4-diphenoxybutane-m-m¹-dicarboxlic acid,
1:5-diphenoxypentane-p-p¹-dicarboxylic acid,
1:5-diphenoxypentane-m-m¹-dicarboxylic acid,
1:6-diphenoxyhexane-p-p¹-dicarboxylic acid,
1:6-diphenoxyhexane-m-m¹-dicarboxylic acid,
1:5-diphenoxy-3-oxadiethane-p-p¹-dicarboxylic acid,
1:5-diphenoxy-3-oxadiethane-m-m¹-dicarboxylic acid.
phenoxybenzene-3:3¹-dicarboxylic acid,
phenoxybenzene-4:4¹-dicarboxylic acid,
diphenylmethane-3:3¹-dicarboxylic acid,
diphenylmethane-4:4¹-dicarboxylic acid.

In other alternative forms of the acid Y may be $-(CH_2)_n-$ group or a $-(CH_2)_nO-$ group in which n is from 1 to 4 and the ether oxygen, if present is directly linked to the divalent aromatic radical X. Typical acids of this class are hydroquinone-O,O'-diacetic acid, 1,4-bis(carboxymethyl)benzene and 2,2-bis(4-hydroxyphenyl)-propane-O-O'-diacetic acid.

In preparing polymers from the mixed anhydrides there may be present mixtures of the mixed anhydrides.

The residues, other than the mixed anhydride residues, making up the polymers of the invention may be derived from any of the aromatic reactants capable of forming polyesters, polyamides or polyesteramides in their own right. For example, the other reactant or reactants may be (a) a dihydric phenol, (b) a hydroxyaryl carboxylic acid, (c) an aminoaryl carboxylic acid, (d) mixtures of dihydric phenols and aromatic dicarboxylic acids, (e) mixtures of aryl diamines and aromatic dicarboxylic acids, (f) mixtures of aminophenols and aromatic dicarboxylic acids, (g) mixtures of aminophenols and hydroxyaryl carboxylic acids or (h) further combinations of the above ingredients. The essential factor in the reactant or reactants other than the mixed anhydride is that there should present a reactant containing at least one functional hydroxyl group so that the polymer produced contains at least 5% but less than 80% of anhydride linkages in the main chain, and the remaining residues are essentially para-linked through ester and, optionally, amide linkages.

It will be appreciated by those skilled in the art that the invention is not restricted to the use of reactants with free functional carboxyl, hydroxyl and amino groups and that appropriate derivatives such as acid chlorides, acyloxy- and acylamino groups may be used as the reacting species.

Typical of the hydroxyaromatic acids which may be used are p-hydroxybenzoic acid and 6-hydroxy-2-naphthoic acid. The latter is particularly preferred because its use gives rise to polymers which can be melt processed at a lower temperature and over a wider range of temperatures than similar polymers based on an equivalent molar amount of p-hydroxybenzoic acid.

The dihydric phenols and aromatic dicarboxylic acids may be chosen from a wide variety of aromatic acids, including the acids suitable for forming the mixed anhydride. It is preferred that the phenols and diacids should have their chain extending bonds in coaxial or in parallel and oppositely extending positions and that only a minor proportion, if any, of phenols and diacids should not conform to this requirement. Readily available, inexpensive monomers are preferred such as terephthalic acid, isophthalic acid, hydroquinone, resorcinol and bibenzoic acid. Minor proportions of bisphenol A, bisphenol S and nuclear substituted diphenols and diacids may be included.

The aminophenols may be selected from p-aminophenol, m-aminophenol, 3-methyl-4-aminophenol and 2-chloro-4-aminophenol.

A suitable aminoaryl carboxylic acid is p-aminobenzoic acid.

Typical aryl diamines are m- and p-phenylene diamine and, in minor proportion, methylene dianiline.

The preferred melt-processable polyester anhydrides contain from 5 to 80 mole % of anhydride linkages and from 20 to 95 mole % of the residues of the polymer are derived from 6-hydroxy-2-naphthoic acid or a polyester-forming derivative thereof and from 0 to 50 mole of the residue of the polymer are derived from other polyester- or polyamide-forming reactants.

The mixed anhydrides are copolymerised with the other polymer-forming reactants under conditions which result in the inclusion of anhydride links in the polymer chain. For example, a difunctional aromatic compound containing at least one hydroxyl group, or ester-forming derivative, is melt condensed with a stoichiometric excess of a mixed acid anhydride or of anhydride-forming components such as difunctional materials containing at least one free carboxyl group, or the alkali metal salt of such a compound, together with a difunctional material containing at least one acid chloride group.

The polymers of the invention have a variety of uses such as for fibres, films and moulding powders. When used as moulding powders the polymers may be formed into compositions containing fillers, particularly fibrous fillers, which will improve the strength of the compositions.

Conventional auxiliary materials, such as antioxidants, heat stabilisers, pigments, lubricants, fire retardants and polymeric toughening agent may also have useful effects on the polymer of the invention.

The invention is further illustrated by the following examples.

EXAMPLE 1

A stirred mixture of 15 g (0.06 mole) of the mixed anhydride of terephthalic acid and acetic acid and 32.2 g (0.14 mole) of p-acetoxynapthoic acid were heated together at 260° C. under a nitrogen atmosphere. Acetic acid and acetic anhydride were distilled off as the temperature was raised to 320° C. The melt was stirred at this temperature for 45 minutes and then the heating of the melt was continued for a further 2 hours at a pressure of about 0.5 mm Hg. The viscosity of the molten mass gradually increased until after about 30 minutes, no apparent change in the melt viscosity was observed. Upon cooling the melt a silvery fibrous solid was obtained. The polymer product was insoluble in dimethyl sulphoxide and in N-methyl pyrrolidone at room temperature. The polymer exhibited liquid crystal behaviour when heated to 255° C. This behaviour was observed at temperatures of >380° C. The polymer began to decompose at temperatures of above 450° C.

EXAMPLE 2

The procedure of Example 1 was followed to produce polymers containing anhydride linkages derived from the mixed anhydride of terephthalic acid and acetic acid and residues of the monomers listed in Table 1. The presence of a thermotropic melt is also recorded in the table.

TABLE 1

| Monomers (moles) | | | | | Temperature at which liquid crystal behaviour observed (°C.) |
|---|---|---|---|---|---|
| TAA[1] | ABA[2] | ANA[3] | HQ[4]/TA[5] | AAA[6]/TA | |
| 0.5 | 0.5 | — | — | — | 290–350 |
| 0.3 | 0.7 | — | — | — | 300->410 |
| 0.3 | 0.35 | — | 0.175/0.175 | — | 280–395 |
| 0.3 | — | — | 0.35/0.35 | — | >380 |
| 0.5 | — | — | 0.25/0.25 | — | >380 |
| 0.3 | 0.28 | 0.42 | — | — | 280->410 |
| 0.05 | — | 0.95 | — | — | 330->410 |
| 0.3 | 0.35 | — | — | 0.175/0.175 | >380 |
| 0.6 | — | 0.4 | — | — | >320 |
| 0.5 | — | 0.5 | — | — | >245 |
| 0.15 | — | 0.85 | — | — | >280 |

[1] TAA is mixed anhydride of terephthalic acid and acetic acid.
[2] ABA is p-acetoxybenzoic acid.
[3] ANA is 6-acetoxy-2-naphthoic acid.
[4] HQ is hydroquinone.
[5] TA is terephthalic acid.
[6] AAA is p-acetoxy acetanilide.

All the polymers produced were insoluble in both dimethyl sulphoxide and N-methyl pyrrolidone at room temperature.

EXAMPLE 3

The general procedure of Example 1 was repeated except in that the mixed anhydride of isophthalic acid and acetic acid (termed IAA) was used. The proportions of comonomers and the thermotropic behaviour of the polymeric product are recorded in Table 2. All the polymers listed in Table 2 were insoluble in dimethyl sulphoxide and in N-methyl pyrrolidone.

TABLE 2

| Monomers (moles) | | | Temperature at which liquid crystal behaviour observed (°C.) |
|---|---|---|---|
| IAA | ABA | ANA | |
| 0.3 | 0.7 | — | 275->410 |
| 0.3 | — | 0.7 | 275->410 |
| 0.5 | — | 0.5 | 180–355 |

EXAMPLE 4

The general procedure of Example 1 was used to prepared polymers using mixtures of the mixed anhydrides of terephthalic acid and acetic acid (TAA) and isophthalic acid and acetic acid (IAA) and the comonomers listed in Table 3. The polymers listed in Table 3 were insoluble in dimethyl sulphoxide and in N-methyl pyrrolidone.

TABLE 3

| Monomers (moles) | | | | Temperature at which thermotropic behaviour observed (°C.) |
|---|---|---|---|---|
| TAA | IAA | ABA | ANA | |
| 0.25 | 0.25 | — | 0.5 | 230–360 |
| 0.075 | 0.075 | — | 0.85 | 300->410 |
| 0.25 | 0.25 | 0.5 | — | 220–280 |
| 0.15 | 0.15 | 0.7 | — | 275->410 |

EXAMPLE 5

The general procedure of Example 1 was used to prepare polymers from the following reactants. The polymers were all insoluble at room temperature in dimethyl sulphoxide.

TABLE 4

| Monomers (moles) | | | | | | | Temperature at which liquid crystal behaviour observed (°C.) |
|---|---|---|---|---|---|---|---|
| TAA | IAA | ANA | HQDA | ClHQDA | TA | ClTA | AAA | |
| 0.15 | — | 0.425 | 0.21 | — | 0.21 | — | — | 260->400 |
| 0.15 | — | 0.425 | — | 0.21 | 0.21 | — | — | 235->400 |
| 0.15 | — | 0.425 | 0.21 | — | — | 0.21 | — | 285->400 |
| 0.15 | — | 0.425 | — | 0.21 | — | 0.21 | — | 255->400 |
| 0.15 | 0.15 | 0.5 | — | — | 0.1 | — | 0.1 | 330->400 |

HQDA is hydroquinone diacetate.
ClHQDA is 2-chlorohydroquinone diacetate.
ClTA is chloroterephthalic acid.

We claim:
1. A melt-processable aromatic polyester anhydride characterised in that from 5 to 80% of the units linking the aromatic reactant residues in the polymer chain have the formula:

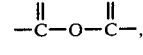

the remaining linkages between the residues of the aromatic reactants being of the formula:

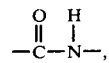

optionally together with linkages of the formula:

$$\begin{matrix} O & H \\ \| & | \\ -C-N- \end{matrix},$$

substantially all of said remaining linkages being disposed in coaxial or parallel and oppositely directed manner with respect to the residues to which they are linked, the polyester anhydride having a solubility of less than 5% by weight in dimethyl sulphoxide at room temperature.

2. An aromatic polyester anhydride according to claim 1 characterised in that the anhydride residues are obtained from the reaction, with ester-forming aromatic reactants, of a mixed anhydride of formula:

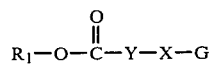

wherein X is a divalent radical comprising one or more fused or separate aromatic rings, Y may be a direct link, a —$(CH_2)_n$— group or a —$(CH_2)_nO$— group in which n may be from 1 to 4 and the ether oxygen, if present, is linked directly to X, $R_1$ is an acyl radical derived from an aliphatic monocarboxylic acid and G is a functional group capable of entering into chain extending reactions and which may be the same or different to the radical

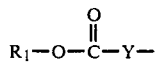

3. An aromatic polyester anhydride according to claim 1 or claim 2 in which Y is a direct link, X is a single aromatic ring and the carboxyl group of the mixed anhydride is disposed in para, meta or ortho positions on the single ring in relation to the group G attached to the single aromatic ring.

4. An aromatic polyesteranhydride according to claim 1 in which the

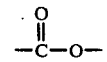

linkages are the residues of reactants selected from the group consisting of dihydric phenols, hydroxyaryl carboxylic acids, mixtures of dihydric phenols and dicarboxylic acids and amino phenols.

5. A melt-processable aromatic polyester anhydride according to claim 1 in which from 20 to 95 mole % of the residues of the polymer are residues of 6-hydroxy-2-naphthoic acid or a polyester-forming derivative thereof and from 0 to 50 mole % of the residues of the polymer are residues of other polyester- or polyamide-forming reactants.

6. An aromatic polyester anhydride according to claim 1 which is capable of exhibiting thermotropic behaviour.

7. A thermotropic melt of a polyester anhydride according to claim 1.

* * * * *